US008215695B2

(12) United States Patent
Ida et al.

(10) Patent No.: US 8,215,695 B2
(45) Date of Patent: Jul. 10, 2012

(54) REMOVABLE VEHICLE SEAT

(75) Inventors: Atsushi Ida, Novi, MI (US); Mikihito Muramatsu, Novi, MI (US); Brian Thiel, Royal Oak, MI (US); Trevor Delanoy, Howell, MI (US); Louis Vetere, Commerce Township, MI (US)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 36 days.

(21) Appl. No.: 12/614,678

(22) Filed: Nov. 9, 2009

(65) Prior Publication Data

US 2011/0109146 A1    May 12, 2011

(51) Int. Cl.
*B60N 2/005* (2006.01)

(52) U.S. Cl. .................. 296/65.03; 296/65.13; 297/248; 297/316; 297/326; 297/335; 297/378.13

(58) Field of Classification Search .................. 248/500, 248/503, 503.1; 296/63, 65.01, 65.03, 65.05, 296/65.13; 297/240, 241, 242, 248, 257, 297/316, 325, 326, 331, 334, 335, 336, 378.1, 297/378.12, 378.13, 463.1, 463.2
See application file for complete search history.

(56) References Cited

U.S. PATENT DOCUMENTS

| 100,150 | A | * | 2/1870 | Hitt | 248/503.1 |
|---|---|---|---|---|---|
| 750,376 | A | * | 1/1904 | Lampitt | 296/53 |
| 1,345,931 | A | * | 7/1920 | Kiehler | 296/65.07 |
| 2,073,315 | A | * | 3/1937 | McManus | 248/165 |
| 3,889,999 | A | * | 6/1975 | Mackintosh | 297/248 |
| 3,915,493 | A | * | 10/1975 | Brown | 296/63 |
| 4,667,917 | A | * | 5/1987 | Takace | 248/398 |
| 4,759,580 | A | * | 7/1988 | Berklich et al. | 296/65.03 |
| 4,822,092 | A | * | 4/1989 | Sweers | 296/63 |
| 4,946,216 | A | * | 8/1990 | Demick | 296/63 |
| 5,338,081 | A | * | 8/1994 | Young et al. | 296/37.14 |
| 5,443,239 | A |   | 8/1995 | Laporte | |
| 5,496,088 | A | * | 3/1996 | Stewart | 296/65.03 |
| 5,593,208 | A | * | 1/1997 | Mitschelen et al. | 297/336 |
| 5,697,662 | A | * | 12/1997 | Leftwich | 296/63 |
| 5,833,203 | A | * | 11/1998 | Denis et al. | 248/503.1 |
| 6,053,555 | A | * | 4/2000 | Neale | 296/65.03 |
| 6,068,232 | A | * | 5/2000 | Bentley | 248/503.1 |
| 6,129,405 | A | * | 10/2000 | Miyahara et al. | 296/65.11 |
| 6,155,626 | A | * | 12/2000 | Chabanne et al. | 296/65.03 |
| 6,345,856 | B1 |   | 2/2002 | Minai | |

(Continued)

FOREIGN PATENT DOCUMENTS

JP          61036030 A  *  2/1986

(Continued)

*Primary Examiner* — Glenn Dayoan
*Assistant Examiner* — Paul Chenevert
(74) *Attorney, Agent, or Firm* — Greenblum & Bernstein, P.L.C.

(57) ABSTRACT

A removable vehicle seat includes a base, a removable seat main body, and a first attachment mechanism and a second attachment mechanism configured to removably attach the removable seat main body to the base. The first attachment mechanism includes a pin provided to the removable seat main body; and an attachment member provided to the base, and provided with a groove to which the pin is inserted. A disengagement prevention structure is provided between the pin and the attachment member, the disengagement prevention structure being configured to prevent the pin from disengaging from the groove. The second attachment mechanism includes a striker provided to the removable seat main body; and a lock device provided to the base and configured to releasably engage with the striker.

5 Claims, 13 Drawing Sheets

U.S. PATENT DOCUMENTS

| | | | |
|---|---|---|---|
| 6,561,583 B2 * | 5/2003 | Glaser | 297/325 |
| 6,655,702 B2 * | 12/2003 | Senger | 280/30 |
| 7,270,375 B2 * | 9/2007 | Lutzka et al. | 297/331 |
| 7,748,766 B2 * | 7/2010 | Villeminey | 296/64 |
| 2006/0028044 A1 * | 2/2006 | Oishi et al. | 296/65.03 |
| 2008/0246299 A1 * | 10/2008 | Maeda et al. | 296/65.05 |
| 2009/0102258 A1 | 4/2009 | Wissner et al. | |
| 2009/0243323 A1 | 10/2009 | Mitsuhashi | |
| 2009/0273211 A1 * | 11/2009 | Hancock et al. | 297/13 |

FOREIGN PATENT DOCUMENTS

JP 06211075 A * 8/1994

* cited by examiner

REMOVABLE VEHICLE SEAT

BACKGROUND OF THE INVENTION

1. Field of the Invention

The present invention relates to a removable seat having a base and a removable seat main body removably attached to the base.

2. Description of Related Art

A conventional removable seat includes, for instance, a slide device, a base attached to the slide device, and a seat main body removably mounted to the base (refer to U.S. Pat. No. 5,443,239 to Laporte). The slide device includes a lower rail and an upper rail, which is slidably attached to the lower rail. The lower rail is removably mounted on a vehicle floor. The base is fixed to the upper rail. An attachment mechanism is provided between the base and the vehicle seat main body, the attachment mechanism removably attaching the seat main body to the base. The attachment mechanism includes a pair of crossbars and attachment members, the crossbars extending in a width direction in front and rear portions of the seat main body, the attachment members being provided to the base. The attachment members are provided with notches into which the crossbars are inserted from rear. The crossbar on the front side is engaged with a catch provided to the attachment member. Thereby, the front side crossbar is prevented from disengaging from the notch.

When the seat main body is mounted to the base, it is necessary to slide the seat main body from rear to front relative to the base. A large slide resistance (frictional force) is generated herein between the seat main body and the base, since the seat main body is relatively heavy. In addition, it is necessary to push the seat main body further strongly, so as to engage the crossbars with the catches. It is also necessary to slide the seat main body to the base for a sufficient distance, so as to engage the crossbars with the catches. It is thus cumbersome to mount the seat main body to the base. Accordingly, the present invention provides a removable vehicle seat that allows easy mounting of a seat main body (removable seat main body) to a base.

SUMMARY OF THE INVENTION

The embodiments of the present invention are provided to address the problems above. An advantage of the embodiments of the present invention is to provide a removable vehicle seat having a base, a removable seat main body, and a first attachment mechanism and a second attachment mechanism configured to removably attach the removable seat main body to the base. The first attachment mechanism includes a pin provided to one of the members of the base and the removable seat main body; and an attachment member provided to the other member, and provided with a groove to which the pin is inserted. A disengagement prevention structure is provided between the pin and the attachment member, the disengagement prevention structure being configured to prevent the pin from disengaging from the groove, when the pin is inserted to the groove and then the removable seat main body is rotated around the pin from a first position to a second position. The second attachment mechanism includes a striker provided to one of the members; and a lock device provided to the other member and configured to releasably engage with the striker when the removable seat main body is rotated from the first position to the second position.

Accordingly, when the removable seat main body is mounted to the base, the removable seat main body is first moved relative to the base, and then the pin is inserted to the groove (moving operation). Subsequently, the removable seat main body is rotated around the pin (rotation operation). Thereby, the pin is prevented from disengaging from the groove by the disengagement prevention structure in the first attachment mechanism. In the second attachment mechanism, the lock device is engaged with the striker. Thus, the removable seat main body can be easily mounted to the base in the moving operation and the rotation operation. In addition, no large slide resistance is generated between the base and the removable seat main body in the moving operation, and thus the moving operation can be easily performed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention is explained with reference to FIGS. 1 to 11. A vehicle is provided with front seats and rear seats, for example, and the rear seats are divided into about 60% and 40% in a width direction. A seat 1 shown in FIGS. 1 and 2 may be used as a 60% portion of the rear seats.

Figure 1:
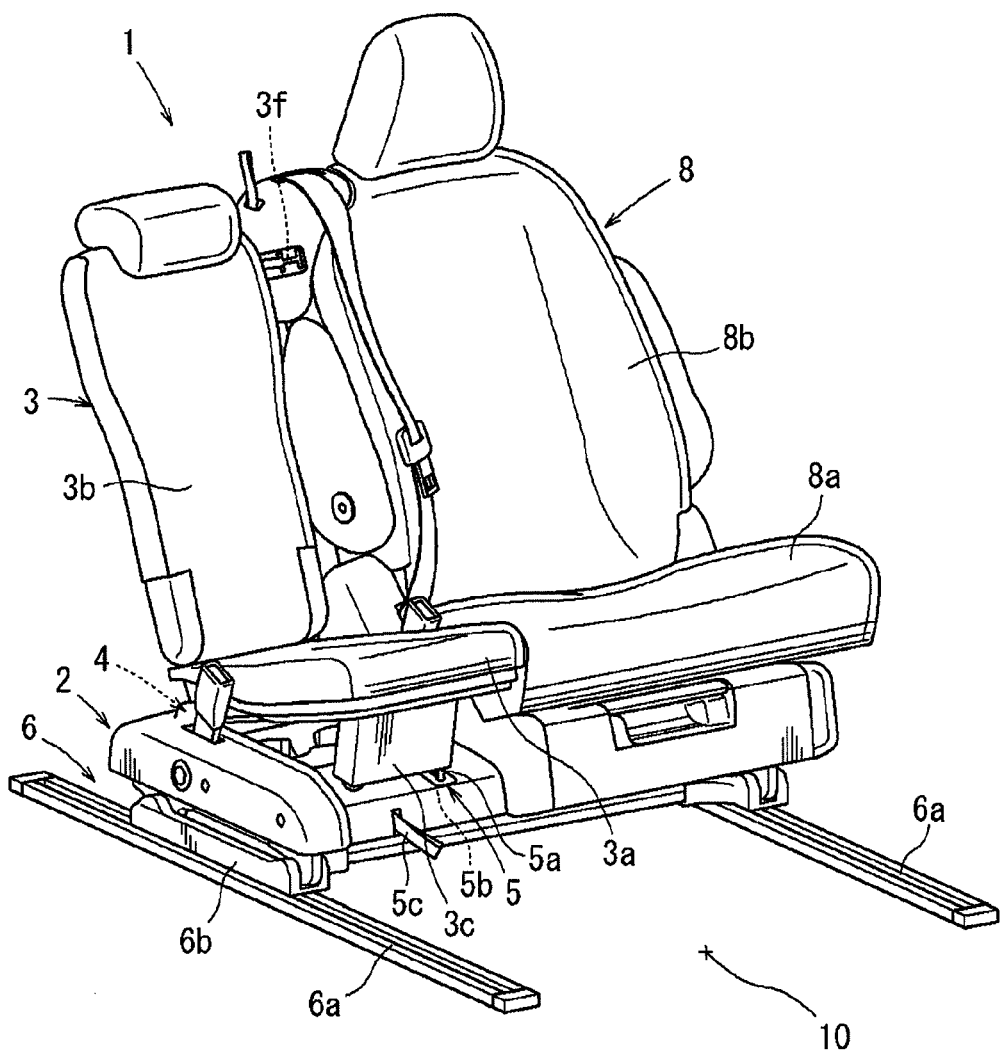
FIG. 1 is a perspective view of a seat in use.
Figure 2:
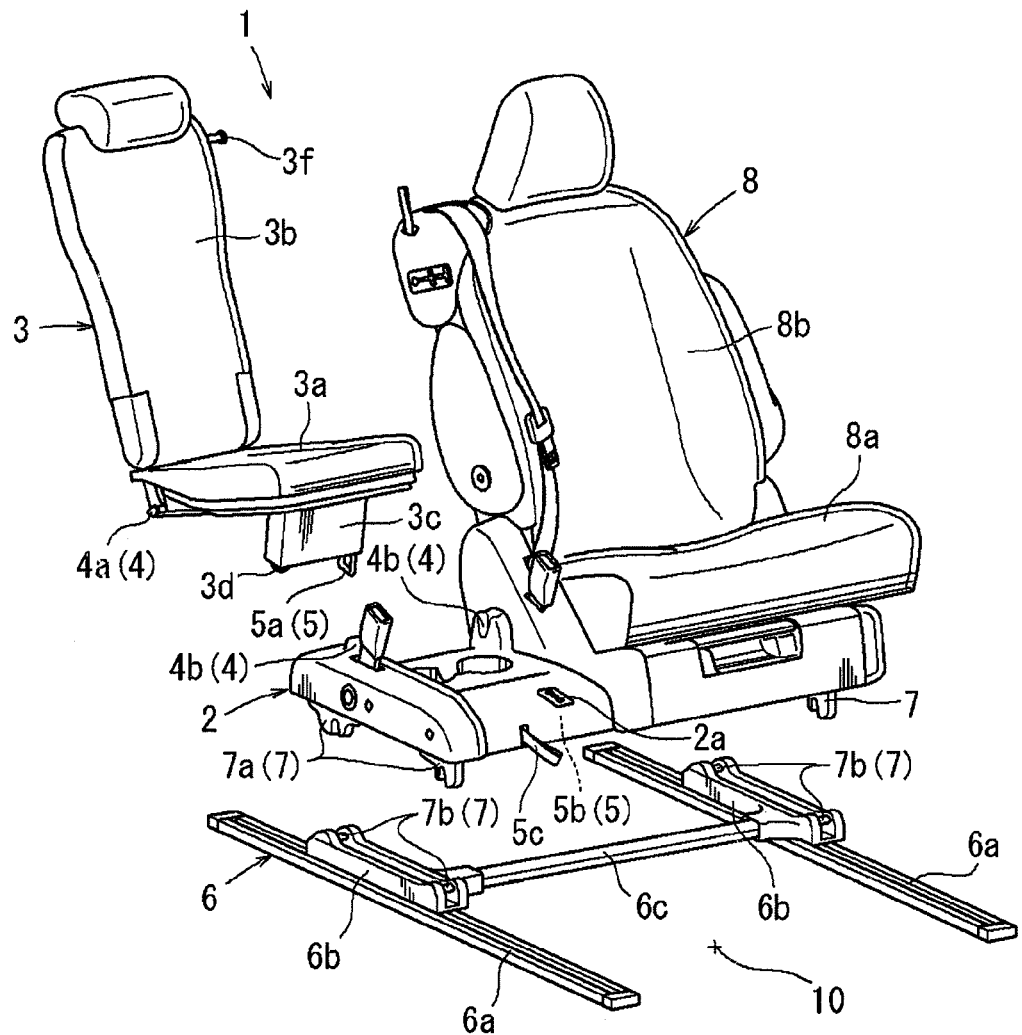
FIG. 2 is a perspective view of the seat when a removable seat main body is removed from a base and the base is removed from a slide device.

As shown in FIGS. 1 and 2, the seat 1 includes a base 2, a removable seat main body (first main body) 3, and a second main body 8. The removable seat main body 3 is removably mounted to the base 2. The second main body 8 is unremovably or removably mounted to the base 2. The second main body 8, which is a seat provided to a side of a vehicle, includes a seat cushion 8a and a seat back 8b. The seat cushion 8a is mounted to the base 2; the seat back 8b is attached to the seat cushion 8a, such that an angle can be adjusted.

The removable seat main body 3, which is provided in a middle portion of the vehicle, includes a seat cushion 3a and a seat back 3b, as shown in FIGS. 1 and 2. The seat back 3b is rotatably connected to a rear portion of the seat cushion 3a. A connector 3f is provided to an upper side surface of the seat back 3b, the connector 3f being connected to the second main body 8. Thus, the seat back 3b is moved to an upright position, at which the seat back 3b stands up relative to the seat cushion 3a, along with the seat back 8b; and a flat position (refer to FIG. 8), at which the seat back 3b falls on the seat cushion 3a, along with or separately from the seat back 8b.

A supporting foot 3c is rotatably connected to a front lower portion of the seat cushion 3a, as shown in FIGS. 1 and 2. The supporting foot 3c is rotated between an upright position, at which the supporting foot 3c stands substantially perpendicular to the seat cushion 3a; and a stowed position, at which the supporting foot 3c is positioned along a lower surface of the seat cushion 3a. The supporting foot 3c is rotated toward rear, and thus moved from the upright position to the stowed position so as to be stowed in a recess 3e provided to the seat cushion 3a. The seat cushion 3a is removably mounted to the base 2 by the a first attachment mechanism 4 and a second attachment mechanism 5.

Figure 3:
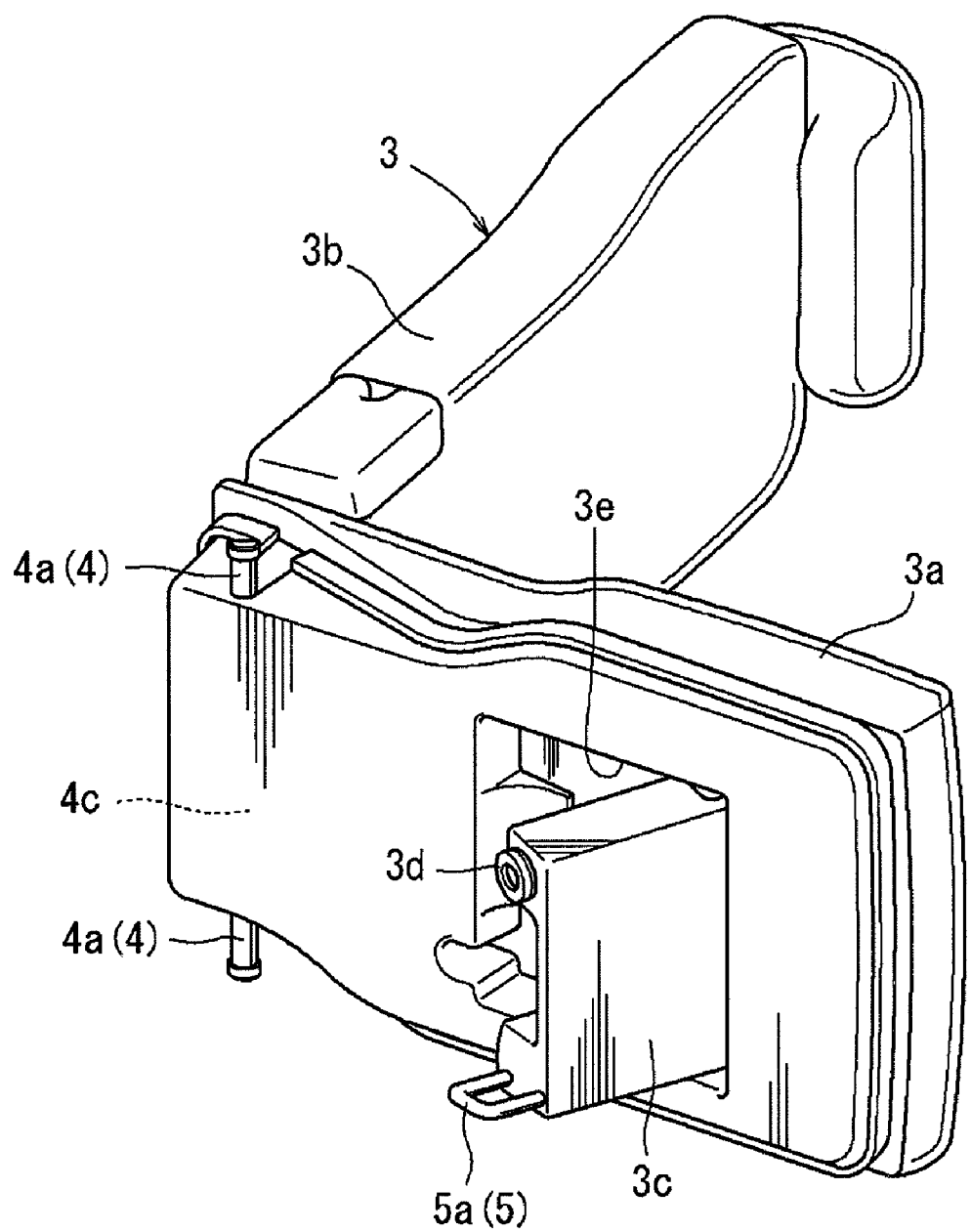
FIG. 3 is a perspective view from a lower side of the removable seat main body.
Figure 6:
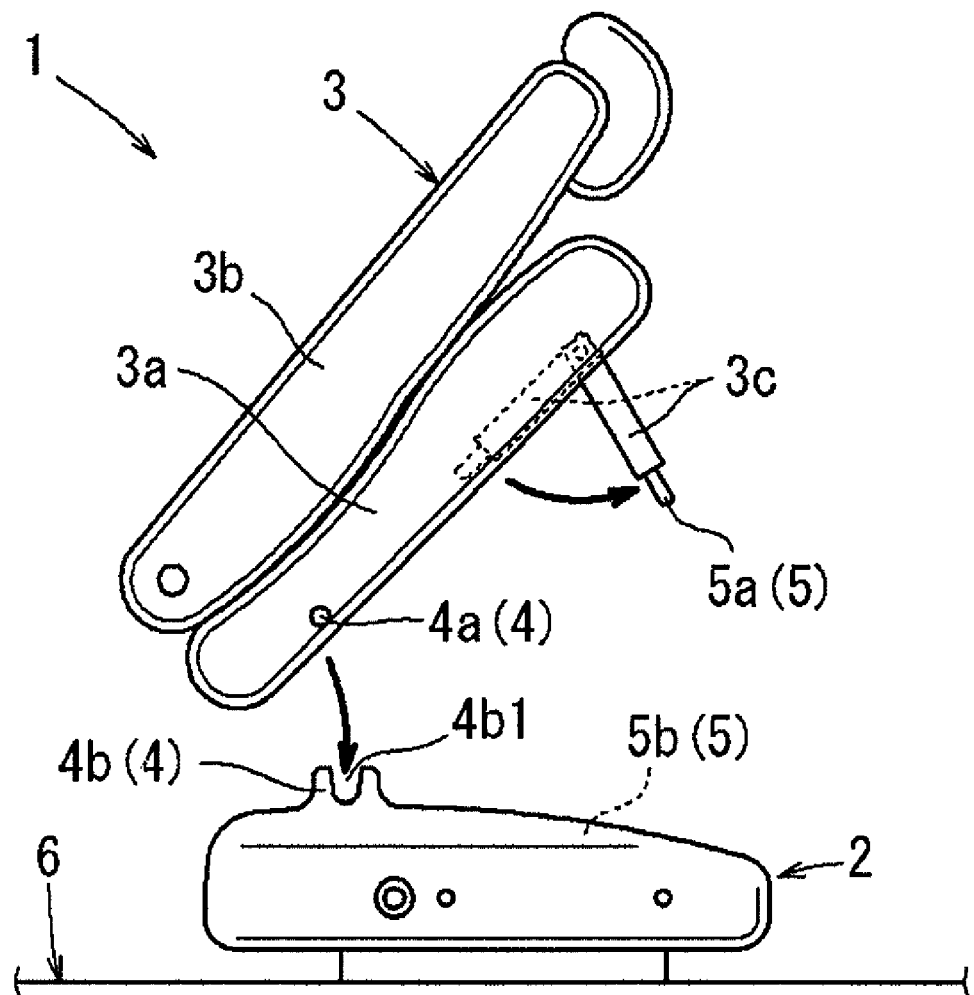
FIG. 6 is a side view of the seat when the removable seat main body is removed from the base.
Figure 9:
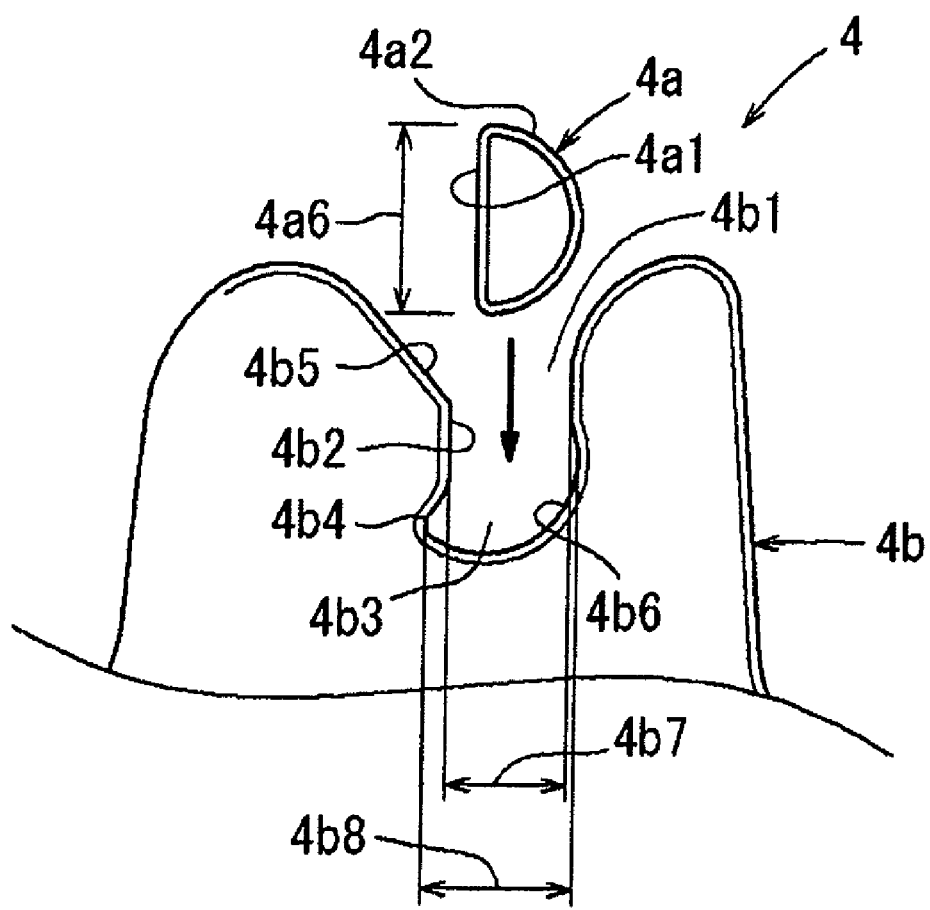
FIG. 9 is a side view of a first attachment mechanism before the pin is inserted to a groove.

As shown in FIGS. 3 and 6, the first attachment mechanism 4 includes a pair of pins 4a provided to the seat cushion 3a, and a pair of attachment members 4b provided to the base 2. The pins 4a are projected in a width direction from rear side surfaces of the seat cushion 3a, as shown in FIGS. 3 and 6. A flat cutout surface 4a1 and a circular surface 4a2 are provided to an external peripheral surface of the pin 4a. The pin 4a has a substantially semi-circular (non-circular) shape from a cross-sectional view, as shown in FIG. 9. The pin 4a has a first width (minimum width) 4a5 and a second width (maximum width) 4a6, which is greater than the first width 4a5.

Figure 4:
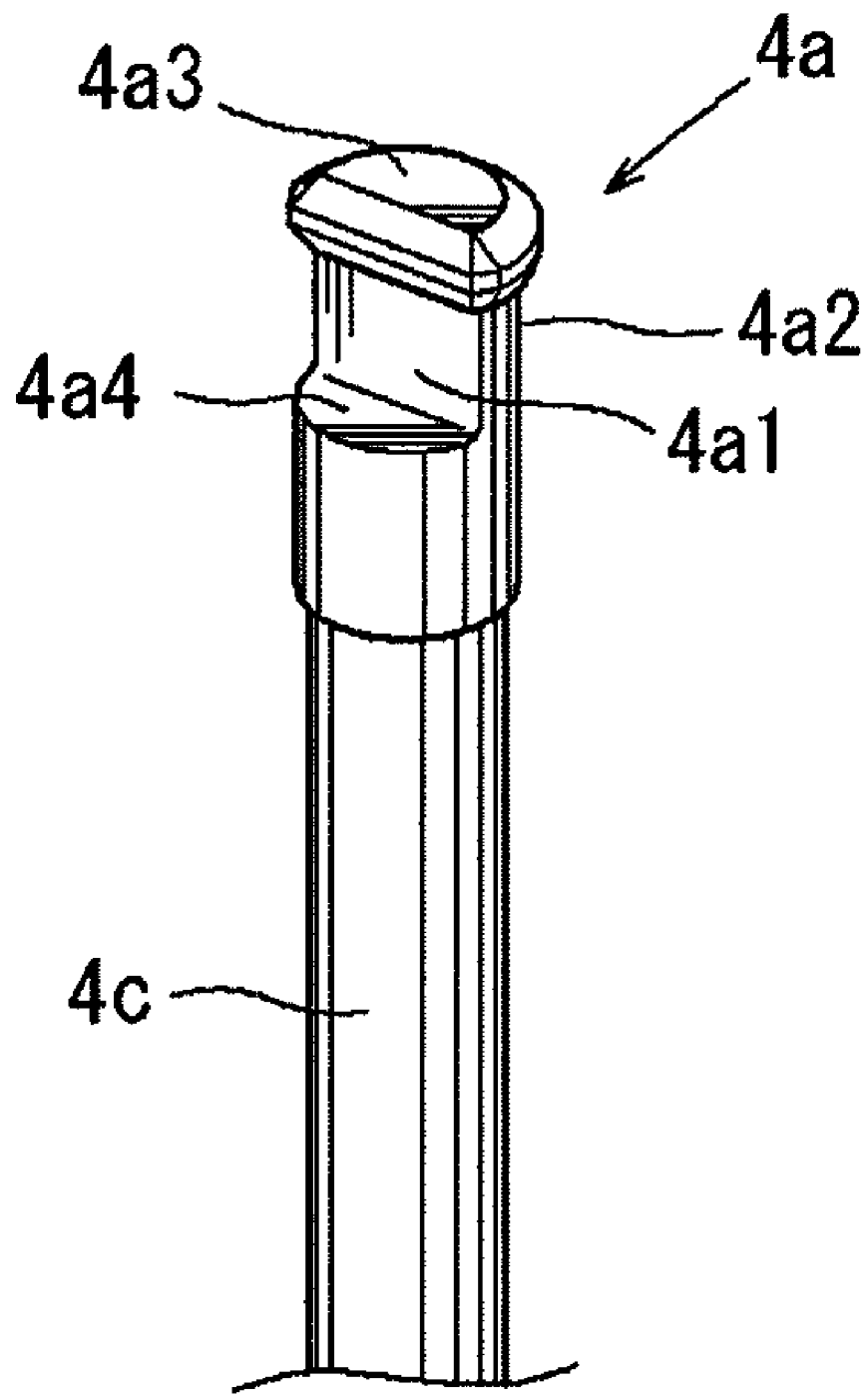
FIG. 4 is a perspective view of a pin.
Figure 5:
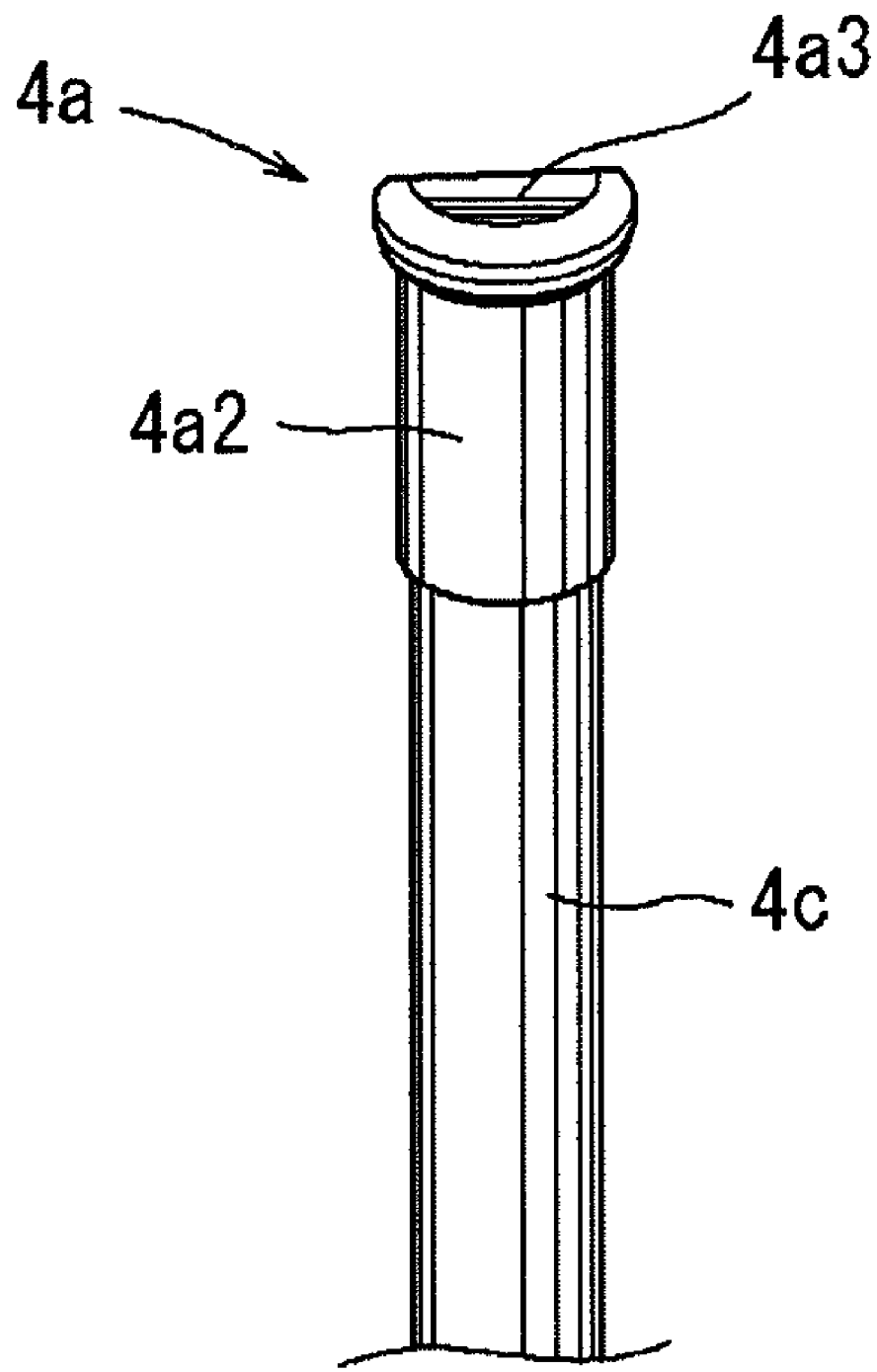
FIG. 5 is a perspective view of the pin.

Regulators 4a3 and 4a4 are provided to a front end portion and a base end portion, respectively, of the pin 4a in an axial direction thereof, as shown in FIG. 4. The regulator 4a3 has a substantially semi-circular shape, and a diameter greater than that of a main body of the pin 4a. The regulator 4a4 is provided adjacent to the cutout surface 4a1, and projected in a diameter direction from the cutout surface 4a1. The pair of pins 4a are connected by a rod 4c, which is inserted through the rear portion of the seat cushion 3a in a seat width direction.

The attachment member 4b is provided with a groove 4b1, through which the pin 4a is inserted, as shown in FIGS. 6 and 9. The groove 4b1 includes a guide 4b5, an entrance 4b2, and an end portion 4b3. A width of the guide 4b5 is gradually narrower from an upper portion toward the entrance 4b2. Thereby, the pin 4a can be guided from above toward the entrance 4b2 by an inclined surface included in the guide 4b5. A width 4b7 of the entrance 4b2 is greater than the first width 4a5 of the pin 4a and less than the second width 4a6 thereof.

Figure 10:
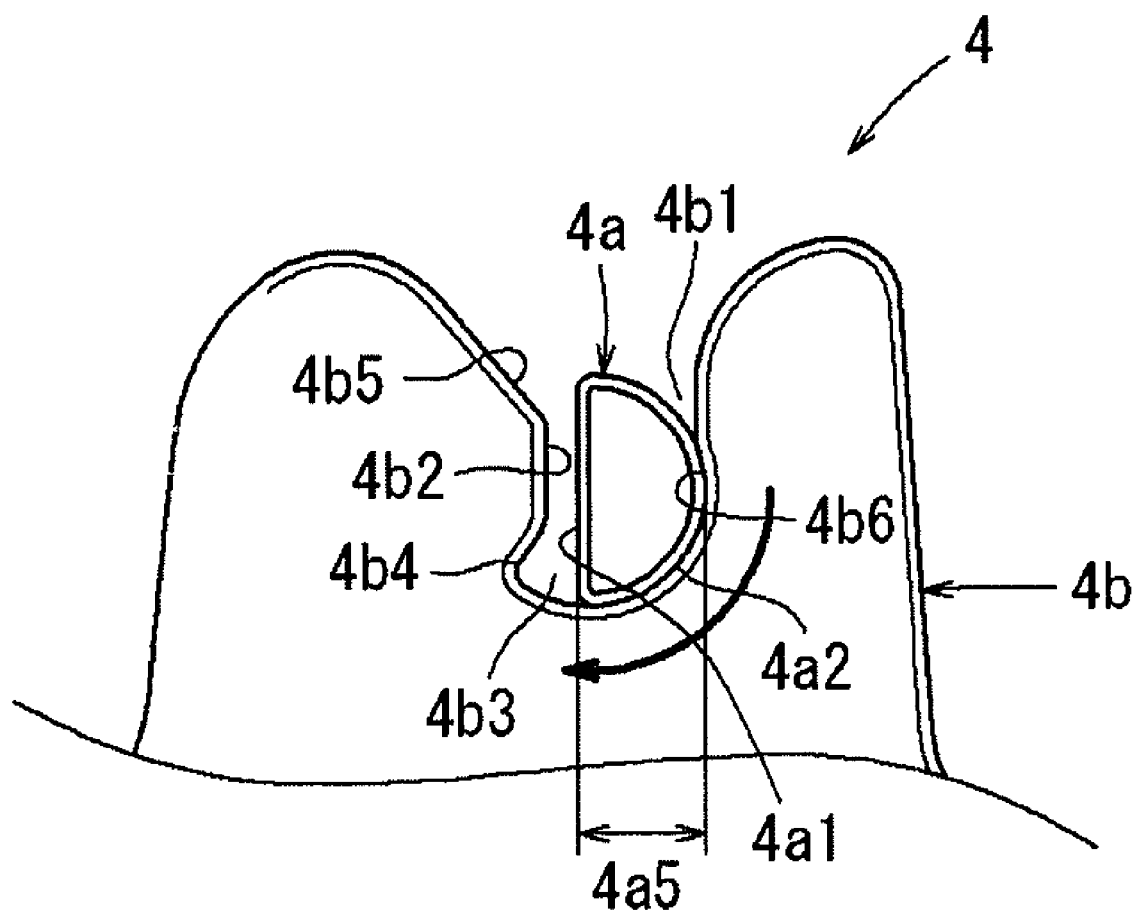
FIG. 10 is a side view of the first attachment mechanism when the pin is inserted to the groove.
Figure 11:
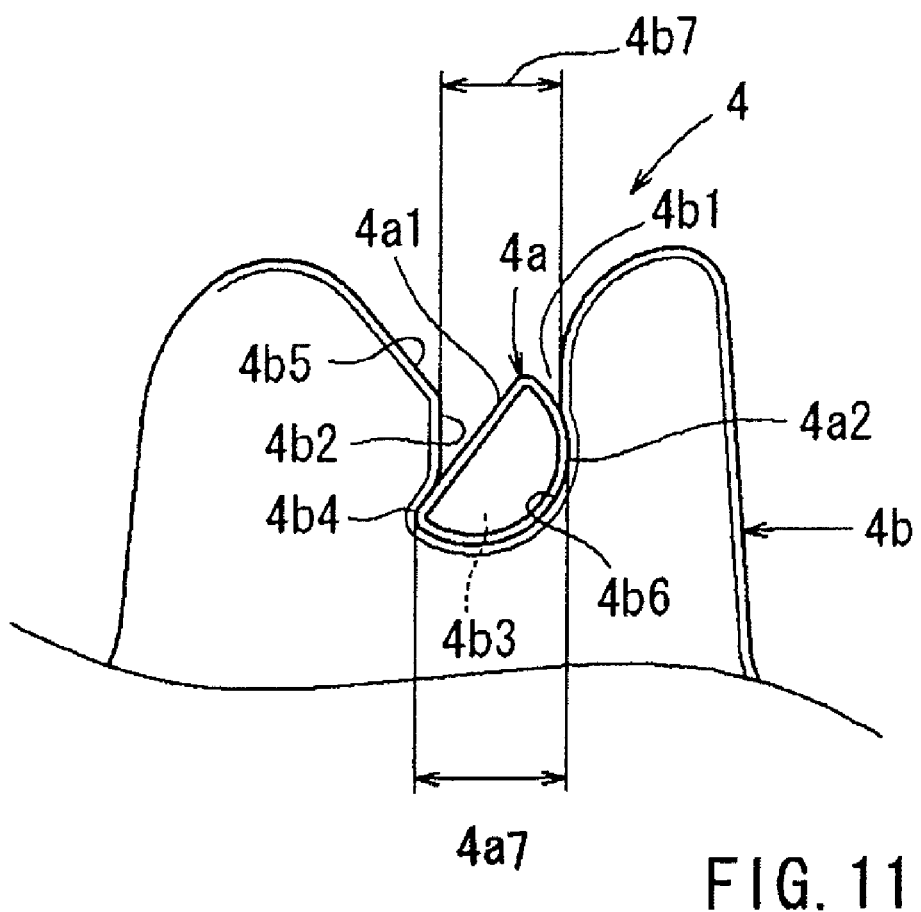
FIG. 11 is a side view of the first attachment mechanism when the pin is prevented from disengaging from the groove.

The end portion 4b3 of the groove 4b1 has a width 4b8, which is wider than the width 4b7 of the entrance 4b2, as shown in FIGS. 9 to 11. The end portion 4b3 thus allows the pin 4a to rotate in the end portion 4b3. The end portion 4b3 has a circular bottom surface 4b6, on which the pin 4a can be slid and rotated about the center axis thereof. A disengagement stopper 4b4 is provided between the entrance 4b2 and the end portion 4b3, the disengagement stopper 4b4 extending from the bottom surface 4b6 of the end portion 4b3 to the entrance 4b2.

When the pin 4a is rotated in the end portion 4b3, as shown in FIGS. 10 and 11, a lateral width 4a7 (a width perpendicular to a direction in which the pin 4a is inserted to the groove 4b1) of the pin 4a is greater than the width 4b7 of the entrance 4b2. The pin 4a can thus be prevented from disengaging from the groove 4b1. Further, the cutout surface 4a1 of the pin 4a faces the disengagement stopper 4b4. Thereby, the pin 4a can surely be prevented from disengaging from the groove 4b1 by the disengagement stopper 4b4.

As shown in FIGS. 3 and 6, the second attachment mechanism 5 includes a striker 5a provided on the seat cushion 3a side, and a lock device 5b provided on the base 2 side. The striker 5a has a U shape and is provided on one side of an end portion of the supporting foot 3c. The striker 5 is projected from the supporting foot 3c. An elastic member 3d is attached to the other side position of the end portion of the supporting foot 3c. By contacting the base 2, the elastic member 3d prevents rattling noise generated when the supporting foot 3c vibrates against the base 2.

Figure 7:
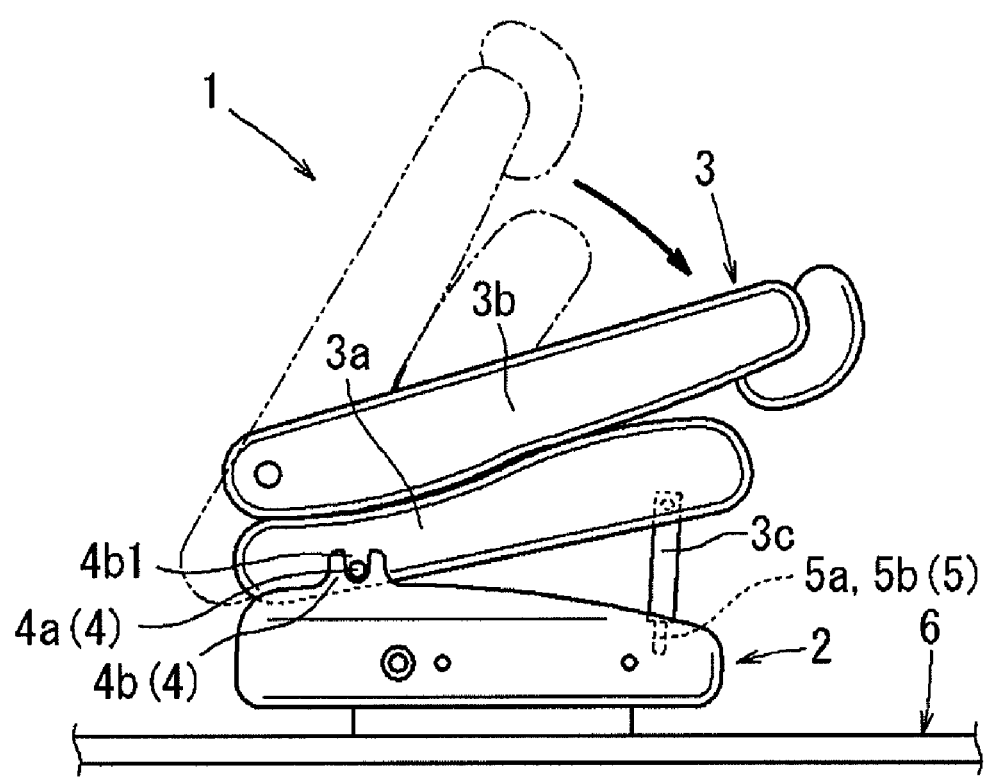
FIG. 7 is a side view of the seat when the removable seat main body is being mounted to the base.

The lock device 5b is provided inside the base 2, as shown in FIGS. 2 and 7. When the striker 5a is inserted into the base 2 from an opening 2a provided to the base 2, the striker 5a comes in contact with the lock device 5b, which is then engaged with the striker 5a. A strap 5c is connected to the lock device 5b. Pulling an end portion of the strap 5c projecting from the base 2 operates the lock device 5b, which then releases the striker 5a.

The base 2 is removably mounted to a slide device 6, as shown in FIGS. 1 and 2. The slide device 6 includes a pair of lower rails 6a attached to a floor 10, and a pair of upper rails 6b slidably mounted to the lower rails 6a. The pair of upper rails 6b are linked by a bar 6c.

An mount mechanism 7 is provided between the base 2 and the upper rails 6b, as shown in FIG. 2, the mount mechanism 7 removably mounting the base 2 to the upper rails 6b. The mount mechanism 7 includes strikers 7b provided to front and rear portions of each of the upper rails 6b, and lock devices 7a provided to left, right, front, and rear portions of the base 2. When being contacted with the strikers 7b from above, the lock devices 7a are engaged with the strikers 7b. The lock devices 7a are connected with an operation member (not shown in the drawing). Operating the operation member operates the lock devices 7a, which then release the strikers 7b. Thereby, the base 2 can be released from the slide device 6.

When the removable seat main body 3 is mounted to base 2, the supporting foot 3c is first rotated relative to the seat cushion 3a from the stowed position to the upright position, as shown in FIG. 6. Subsequently, while the seat cushion 3a is held obliquely, the removable seat main body 3 is moved downward. Then, the pin 4a is inserted to the groove 4b1 from above thereof, as shown in FIGS. 9 and 10. The pin 4a then is passed through the entrance 4b2, and comes in contact with the bottom surface 4b6.

Figure 8:
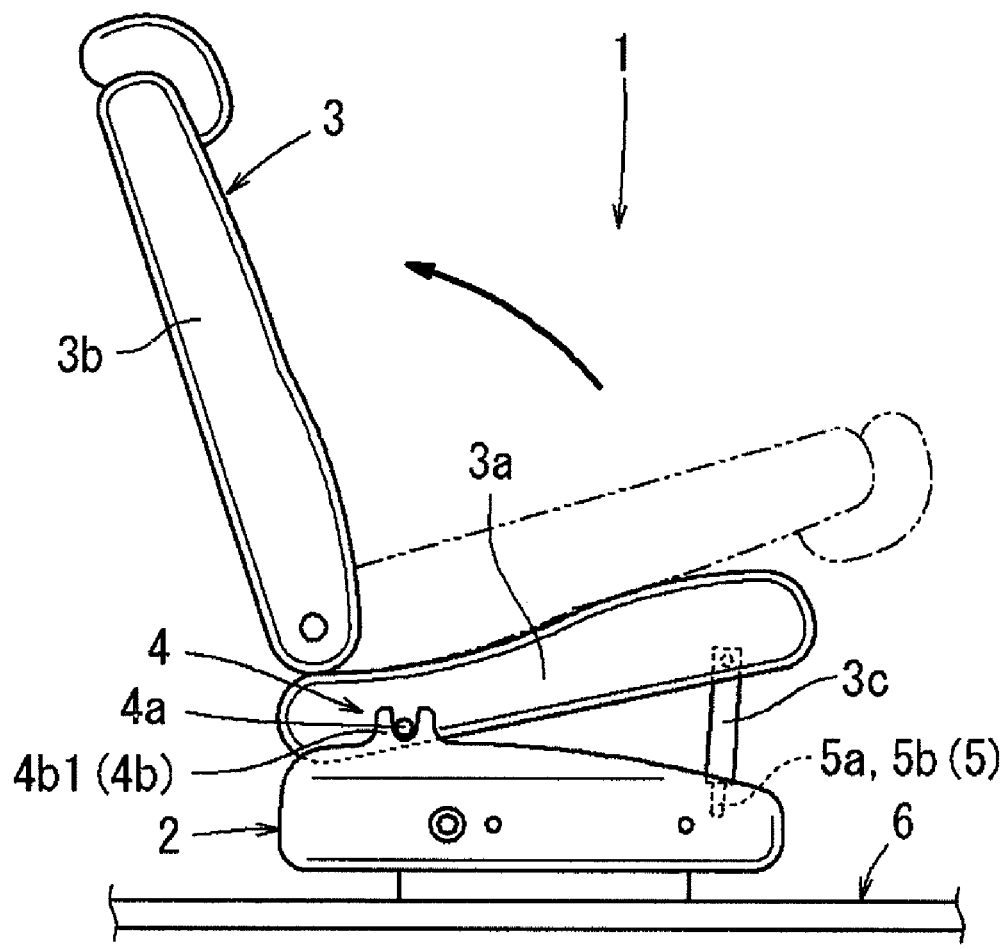
FIG. 8 is a side view of the seat in use.

Subsequently, the removable seat main body 3 is rotated forward around the pin 4a, from a first position indicated with a phantom line to a second position indicated with a solid line, as shown in FIG. 7. The striker 5a is thus engaged with the lock device 5b. The pin 4a is rotated in the end portion 4b3 of the groove 4b1, as shown in FIG. 11. Thereby, the cutout surface 4a1 faces the disengagement stopper 4b4, and thus the pin 4a can be prevented from disengaging from the groove 4b1 (disengagement prevention structure). Thereafter, the seat back 3b is rotated relative to the seat cushion 3a, from the flat position indicated with a phantom line to the upright position indicated with a solid line, as shown in FIG. 8.

When the removable seat main body 3 is removed from base 2, the seat back 3b is tilted down relative to the seat cushion 3a, from the upright position (solid line position of FIG. 8) to the flat position (phantom line position). Then, the strap 5c shown in FIG. 1 is pulled, and thereby the lock device 5b releases the striker 5a. Thereafter, the removable seat main body 3 is rotated from the second position (solid line position of FIG. 7) to the first position (phantom line position). Subsequently, the removable seat main body 3 is lifted relative to the base 2, and then the supporting foot 3c is rotated from the upright position (solid line position of FIG. 6) to the stowed position (phantom line position).

The seat 1 is configured as above. The first attachment mechanism 4 has the pin 4a and the attachment member 4b having the groove 4b1, as shown in FIG. 7. The disengagement prevention structure is provided between the pin 4a and the attachment member 4b, the disengagement prevention structure configured to prevent the pin 4a from disengaging from the groove 4b1, when the pin 4a is inserted to the groove 4b1, and then the removable seat main body 3 is rotated around the pin 4a from the first position to the second position. The second attachment mechanism 5 includes the striker 5a and the lock device 5b, which is releasably engaged with the striker 5a when the removable seat main body 3 is rotated from the first position to the second position.

Accordingly, when the removable seat main body 3 is mounted to the base 2, the removable seat main body 3 is first moved relative to the base 2, and then the pin 4a is inserted to the groove 4b1 (moving operation). Subsequently, the removable seat main body 3 is rotated around the pin 4a (rotation operation). Thereby, the pin 4a is prevented from disengaging from the groove 4b1 by the disengagement prevention structure in the first attachment mechanism 4. In the second attachment mechanism 5, the lock device 5b is engaged with the striker 5a. Thus, the removable seat main body 3 can be easily mounted to the base 2 in the moving operation and the rotation operation. In addition, no large slide resistance is generated between the base 2 and the removable seat main body 3 in the moving operation, and thus the moving operation can be easily performed.

The pin 4a has the first width 4a5 and the second width 4a6 cross-sectionally as the disengagement prevention structure, as shown in FIGS. 9 to 11. The groove 4b1 includes the entrance 4b2 and the end portion 4b3 as the disengagement prevention structure. Thus, the pin 4a can be prevented from disengaging from the groove 4b1 when the pin 4a is rotated in the end portion 4b3 of the groove 4b1. Further, the disengagement prevention structure can be simply structured with the shape of the groove 4b1 and the cross-sectional shape of the pin 4a.

The cutout surface 4a1 is provided to the pin 4a, and the disengagement stopper 4b4 is provided to the groove 4b1, as shown in FIG. 11. When the removable seat main body 3 is rotated from the first position to the second position, as shown in FIG. 7, the cutout surface 4a1 faces the disengagement stopper 4b4, as shown in FIG. 11. Thereby, the pin 4a can surely be prevented from disengaging from the groove 4b1, by the cutout section 4a1 and the disengagement stopper 4b4.

The end portion 4b3 of the groove 4b1 is provided with the circular bottom surface 4b6, as shown in FIG. 9. The pin 4a is provided with the circular surface 4a2 corresponding to the bottom surface 4b6. Thus, when the circular surface 4a2 of pin 4a is slid on the bottom surface 4b6 of the groove 4b1, the pin 4a can be smoothly rotated in the end portion 4b3 of the groove 4b1.

As shown in FIG. 4, the pin 4a is provided with the regulators 4a3 and 4a4 adjacent to the groove 4b1 shown in FIG. 11 and the like, the regulators 4a3 and 4a4 being capable of regulating a movement of the pin 4a in the axial direction thereof relative to the groove 4b1 (paper thickness direction of FIG. 11). Thereby, the pin 4a is prevented from being shaky in the axial direction thereof relative to the groove 4b1, and thus the removable seat main body 3 can be prevented from being shaky relative to the base 2.

The removable seat main body 3 includes the seat cushion 3a and the supporting foot 3c, as shown in FIG. 3. The striker 5a is attached to the supporting foot 3c. Thus, when the supporting foot 3c is provided along the removable seat main body 3 while the removable seat main body 3 is removed from the base 2, the removable seat main body 3 can be compactly stowed.

The slide device 6 is provided attached to the vehicle floor 10, as shown in FIG. 2, such that the base 2 is removably attached to the slide device 6. Thereby, the base 2 can be removed from the slide device 6 while the slide device 6 is left on the floor 10.

The groove 4b1 is opened upward and extended vertically, as shown in FIG. 9. When the removable seat main body 3 is moved downward to the base 2 using gravity, as shown in FIG. 6, the pin 4a can be inserted from above to the groove 4b1. Thus, no slide resistance (frictional force) is generated unlike in a conventional manner, in which the removable seat main body 3 is slid horizontally relative to the base 2. The pin 4a can then easily and surely be inserted to the groove 4b1. In addition, the pin 4a can be regulated in its front and rear movement by the front and rear wall surfaces.

The striker 5a is engaged from above to the lock device 5b, as shown in FIG. 7. Thus, the striker 5a can be easily engaged with the lock device 5b using weight of the removal seat main body 3.

Alternative Embodiment

The present invention is not limited to the embodiment above, but may be embodied in other forms as described below. In lieu of the pin 4a and the groove 4b1 shown in FIGS. 9 to 11, for instance, a pin 4f and a groove 4g1 shown in FIGS. 12 an 13 may be employed. The pin 4f has a substantially rectangular shape from a cross-sectional view, and is provided with cutout surfaces 4f1 and 4f2 on both surfaces. The groove 4g1 is provided to an attachment member 4g and provided with an entrance 4g2 and an end portion 4g3.

Figure 12:
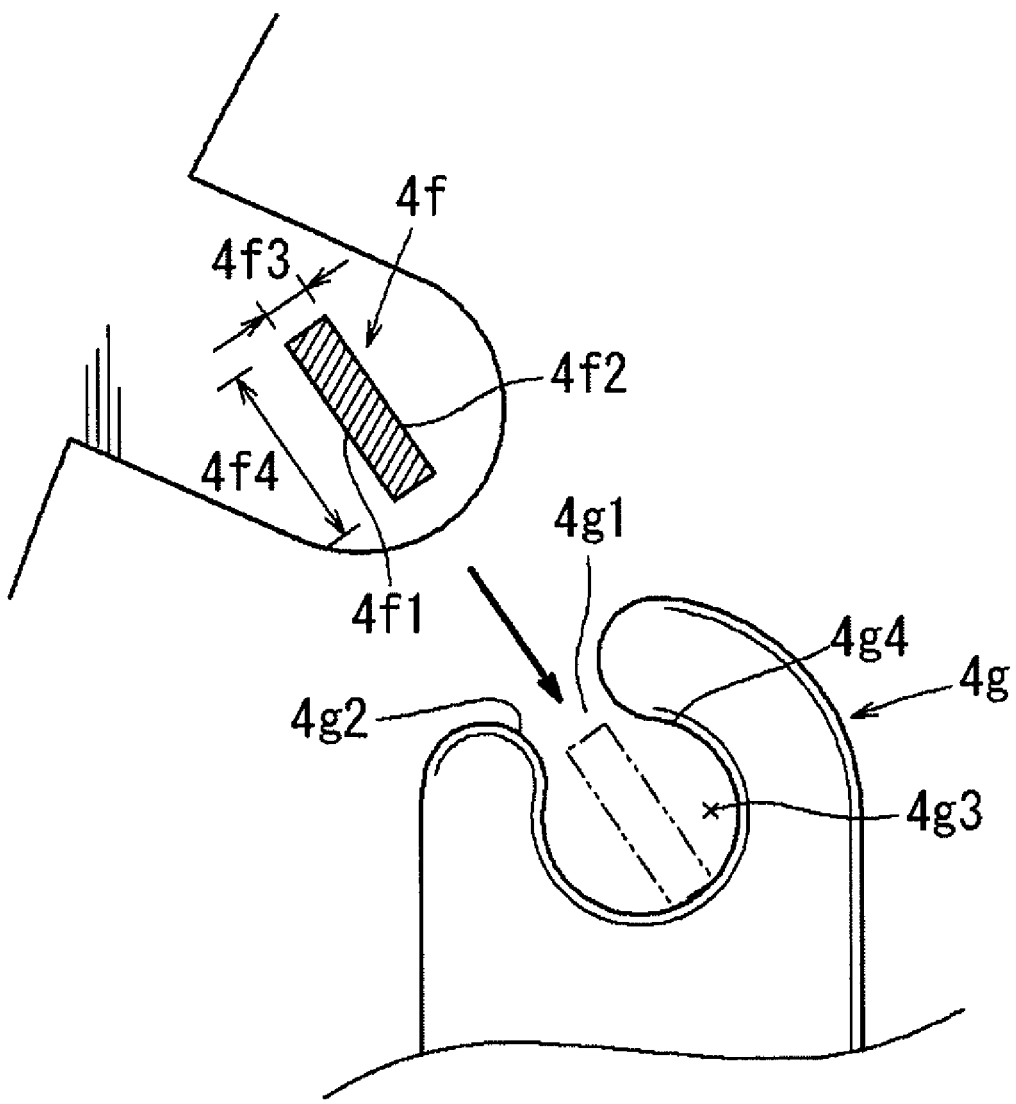
FIG. 12 is a side view of a first attachment mechanism according to an alternative configuration, before a pin is inserted to a groove.
Figure 13:
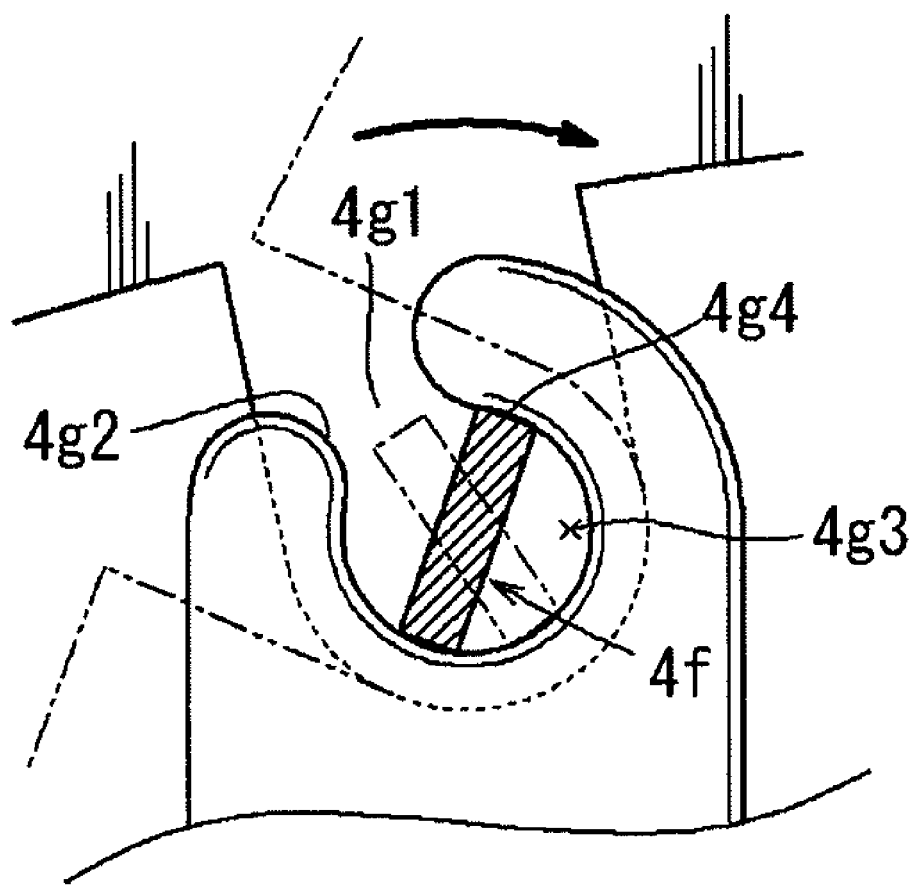
FIG. 13 is a side view of the first attachment mechanism according to the alternative configuration, when the pin is prevented from disengaging from the groove.

A width of the entrance 4g2 is greater than a first width (minimum width) 4f3 of the pin 4f and less than a second width (maximum width) 4f4 thereof, as shown in FIGS. 12 and 13. The end portion 4g3 has a width greater than the entrance 4g2, thus allowing the pin 4f to rotate in the end portion 4g3 about the center axis thereof. A disengagement stopper 4g4 is provided between the end portion 4g3 and the entrance 4g2, the disengagement stopper 4g4 extending from the end portion 4g3 toward the entrance 4g2. When the pin 4f is rotated in the end portion 4g3, the pin 4f can be prevented from disengaging from the groove 4g1 by the disengagement stopper 4g4.

The removable seat main body 3 shown in FIG. 2 includes the seat cushion 3a and the seat back 3b. However, the removable seat main body may have the seat cushion, and the seat back may be attached to a vehicle body. Alternatively, the removable seat main body may have the seat back, and the seat cushion may be attached to the base, separately from the removable seat main body.

The base 2 shown in FIG. 1 is attached to the floor 10 via the slide device 6. The base, however, may be attached to a side surface and the like of a vehicle body. Alternatively, the base may be directly attached to the floor without the slide device.

In the seat 1 shown in FIG. 2, the first attachment mechanism 4 is provided to the rear portion of the removable seat main body 3, and the second attachment mechanism 5 is provided to the front portion of the removable seat main body 3. However, the first attachment mechanism may be provided to the front portion of the removable seat main body, and the second attachment mechanism may be provided to the rear portion of the removable seat main body. Alternatively, the first attachment mechanism may be provided to one side portion of the removable seat main body, and the second attachment mechanism provided to the other side portion of the removable seat main body.

The first attachment mechanism 4 shown in FIG. 2 includes the pin 4a provided to the removable seat main body 3, and the attachment member 4b provided to the base 2. However, the first attachment mechanism may include the pin provided to the base, and the attachment member provided to the removable seat main body.

The second attachment mechanism 5 shown in FIG. 2 includes the striker 5a provided to the removable seat main body 3, and the lock device 5b provided to the base 2. However, the second attachment mechanism may include the striker provided to the base, and the lock device provided to the removable seat main body.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A removable vehicle seat comprising:
    a base;
    a removable seat main body; and
    a first attachment mechanism and a second attachment mechanism configured to removably attach the removable seat main body to the base, wherein
    the first attachment mechanism comprises:
        a pin provided to one of the base and the removable seat main body, the pin including:
            a cutout surface;
            a first width; and
            a second width having a width greater than the first width cross-sectionally; and
        an attachment member provided to the other of the base and the removable seat main body, and provided with a groove to which the pin is inserted, the groove including:
            an entrance having a width greater than the first width of the pin and less than the second width of the pin,
            an end portion having a width greater than the entrance and allowing the pin to rotate, and
            a disengagement stopper extending from the end portion toward the entrance, wherein
    the pin and the attachment member form a disengagement prevention structure configured such that when the pin is inserted into the groove and the removable seat main body is rotated around the pin from a first position to a second position the cutout surface of the pin faces the disengagement stopper of the groove to prevent the pin from disengaging from the groove, and to allow the pin to disengage from the groove when the main body is rotated around the pin from the second position to the first position, and wherein
    the second attachment mechanism comprises:
        a striker provided to one of the base and the removable seat main body; and
        a lock device provided to the other of the base and the removable seat main body and configured to releasably engage with the striker when the removable seat main body is rotated from the first position to the second position.

2. The removable vehicle seat according to claim 1, wherein
    the end portion of the groove is provided with a circular bottom surface; and
    the pin is provided with a circular surface corresponding to the circular bottom surface.

3. The removable vehicle seat according to claim 1, wherein the pin is provided with a regulator adjacent to the groove so as to regulate a movement of the pin in a shaft direction relative to the groove.

4. The removable vehicle seat according to claim 1, wherein
    the removable seat main body comprises a seat cushion and a supporting foot rotatably attached to the seat cushion; and
    one of the striker and the lock device is attached to the supporting foot.

5. The removable vehicle seat according to claim 1 further comprising:
    a slide device attached to a vehicle floor, wherein
    the base is removably attached to the slide device.

* * * * *